(12) United States Patent
Polyakov (10) Patent No.: US 11,608,907 B1
(45) Date of Patent: Mar. 21, 2023

(54) SOLENOID VALVE

(71) Applicant: PIPL LIMITED, Nicosia (CY)

(72) Inventor: Maxym Polyakov, Edinburgh (GB)

(73) Assignee: PIPL LIMITED, Nicosia (CY)

( * ) Notice: Subject to any disclaimer, the term of this patent is extended or adjusted under 35 U.S.C. 154(b) by 0 days.

(21) Appl. No.: 17/891,309

(22) Filed: Aug. 19, 2022

(51) Int. Cl.
*F16K 31/06* (2006.01)
*F16K 11/044* (2006.01)
*F16K 31/42* (2006.01)

(52) U.S. Cl.
CPC ........ *F16K 31/0627* (2013.01); *F16K 11/044* (2013.01); *F16K 31/0675* (2013.01); *F16K 31/423* (2013.01); *F16K 31/426* (2013.01)

(58) Field of Classification Search
CPC ............... F16K 11/044; F16K 31/0606; F16K 31/0613; F16K 31/0617; F16K 31/0627; F16K 31/0693; F16K 31/1221; F16K 31/423; F16K 31/426; Y10T 137/86614; Y10T 137/87209
USPC ................ 335/236; 251/30.01, 30.02, 30.04, 251/129.07, 129.21
See application file for complete search history.

(56) References Cited

U.S. PATENT DOCUMENTS

| | | | | |
|---|---|---|---|---|
| 2,926,883 A | * | 3/1960 | Prybylski | F16K 23/00 251/30.02 |
| 3,002,532 A | * | 10/1961 | Carlson | F16K 31/426 91/417 R |
| 3,349,800 A | * | 10/1967 | Herion | F16K 31/423 137/625.48 |
| 3,502,109 A | * | 3/1970 | Straight | F16K 31/426 137/625.64 |
| 3,688,797 A | * | 9/1972 | Sorenson | F15B 13/0821 137/625.64 |
| 3,913,620 A | * | 10/1975 | Pauliukonis | F16K 31/423 251/333 |
| 4,150,695 A | * | 4/1979 | Kosugui | F16K 31/426 137/625.64 |
| 4,245,671 A | * | 1/1981 | Kosugui | F16K 31/426 137/625.6 |
| 4,531,547 A | * | 7/1985 | Hadden | F16K 31/423 137/625.6 |
| 4,553,735 A | * | 11/1985 | Brundage | F16K 31/0693 335/297 |
| 6,489,870 B1 | * | 12/2002 | Ward | H01F 7/13 335/282 |

(Continued)

*Primary Examiner* — Matthew W Jellett
(74) *Attorney, Agent, or Firm* — Georgiy L. Khayet (57) ABSTRACT

A solenoid valve assembly is provided. The solenoid valve assembly includes a pilot assembly, a body, and a main poppet valve assembly. The pilot assembly includes a frame having an external wall and an internal wall forming an annular cavity. The body includes an inlet cavity, a channel, an outlet cavity, and a main poppet valve seat disposed in the channel between the inlet cavity and the outlet cavity. The main poppet valve assembly includes a main poppet valve and two movable sealing elements. The main poppet valve has a cylindrical shape having an internal diameter, an external diameter, and grooves. The main poppet valve is at least partially disposed in the annular cavity and configured to shut the main poppet valve seat. The movable sealing elements are disposed in the grooves to seal the main poppet valve to the external wall and the internal wall of the frame.

20 Claims, 4 Drawing Sheets

(56) References Cited

U.S. PATENT DOCUMENTS

| | | | |
|---|---|---|---|
| 6,543,481 B2* | 4/2003 | Neff | F15B 13/0403 |
| | | | 137/625.63 |
| 6,601,822 B2* | 8/2003 | Tachibana | F16K 31/0613 |
| | | | 137/625.69 |
| 7,147,006 B2* | 12/2006 | Shaw | F16K 31/406 |
| | | | 137/627.5 |
| 8,757,587 B2* | 6/2014 | Miura | F16K 31/0658 |
| | | | 335/236 |
| 9,523,441 B2* | 12/2016 | Abe | F16K 31/0627 |
| 2007/0164243 A1* | 7/2007 | Volz | F16K 31/0603 |
| | | | 251/30.03 |
| 2015/0123460 A1* | 5/2015 | Prescott | B60T 13/268 |
| | | | 251/30.02 |
| 2021/0025517 A1* | 1/2021 | Schander | H01F 7/1607 |
| 2022/0196181 A1* | 6/2022 | Saldanha | B64D 25/14 |

\* cited by examiner

SOLENOID VALVE

TECHNICAL FIELD

This disclosure relates to pneumatic and hydraulic control units used for remote opening and closing of pipelines. More specifically, this disclosure relates to solenoid valves.

BACKGROUND

Solenoid valves are widely used for remote opening and closing of pipelines in many technological applications, including rocket engines, launch vehicles, and spacecraft. However, conventional solenoid valves have weight and dimensional characteristics that do not provide the optimal operation regime of an apparatus in which the solenoid valve is installed. Specifically, the optimal operational regime cannot be provided because the actuation time of conventional solenoid valves is not fast enough. Moreover, the structures of the conventional solenoid valves are not flexible enough for use in manufacturing different modifications of solenoid valves.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a solenoid valve assembly is provided. The solenoid valve assembly may include a pilot assembly, a body, and a main poppet valve assembly. The pilot assembly may include a frame that may have an external wall and an internal wall forming an annular cavity. The body may include an inlet cavity, a channel, an outlet cavity, and a main poppet valve seat disposed in the channel between the inlet cavity and the outlet cavity. The main poppet valve assembly may include a main poppet valve and a movable sealing element. The main poppet valve may be of a cylindrical shape having an internal diameter, an external diameter, a first annular groove, and a second annular groove. The main poppet valve may be at least partially disposed in the annular cavity and configured to shut the main poppet valve seat, thereby controlling a substance flow from the inlet cavity via the channel to the outlet cavity. The first movable sealing element may be disposed in the first annular groove to seal the main poppet valve to the external wall of the frame. The second movable sealing element may be disposed in the second annular groove to seal the main poppet valve to the internal wall of the frame.

According to another embodiment of the present disclosure, a method for manufacturing a solenoid valve assembly is provided. The method may commence with manufacturing a pilot assembly. The pilot assembly may include a frame having an external wall and an internal wall that form an annular cavity. The method may further include manufacturing a body. The body may include an inlet cavity, a channel, an outlet cavity, and a main poppet valve seat disposed in the channel between the inlet cavity and the outlet cavity. The method may continue with manufacturing a main poppet valve assembly. The main poppet valve assembly may include a main poppet valve of a cylindrical shape having an internal diameter, an external diameter, a first annular groove, and a second annular groove. The main poppet valve may be at least partially disposed in the annular cavity and configured to shut the main poppet valve seat, thereby controlling a substance flow from the inlet cavity via the channel to the outlet cavity. The method may further include disposing a first movable sealing element in the first annular groove to seal the main poppet valve to the external wall of the frame. The method may further include disposing a second movable sealing element in the second annular groove to seal the main poppet valve to the internal wall of the frame.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The disclosure relates to pneumatic-hydraulic control units that can be used for remote opening and closing of pipelines. Specifically, disclosed herein is a multi-purpose solenoid valve assembly that may be used in rocket engines, launch vehicles, and spacecrafts. Unlike a conventional solenoid valve, the solenoid valve assembly of the present disclosure utilizes a double movable seal allowing optimizing the weight and dimensional characteristics of the solenoid valve assembly, reducing the actuation time of the solenoid valve assembly, and facilitating the manufacturability of thereof.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Figure 1:
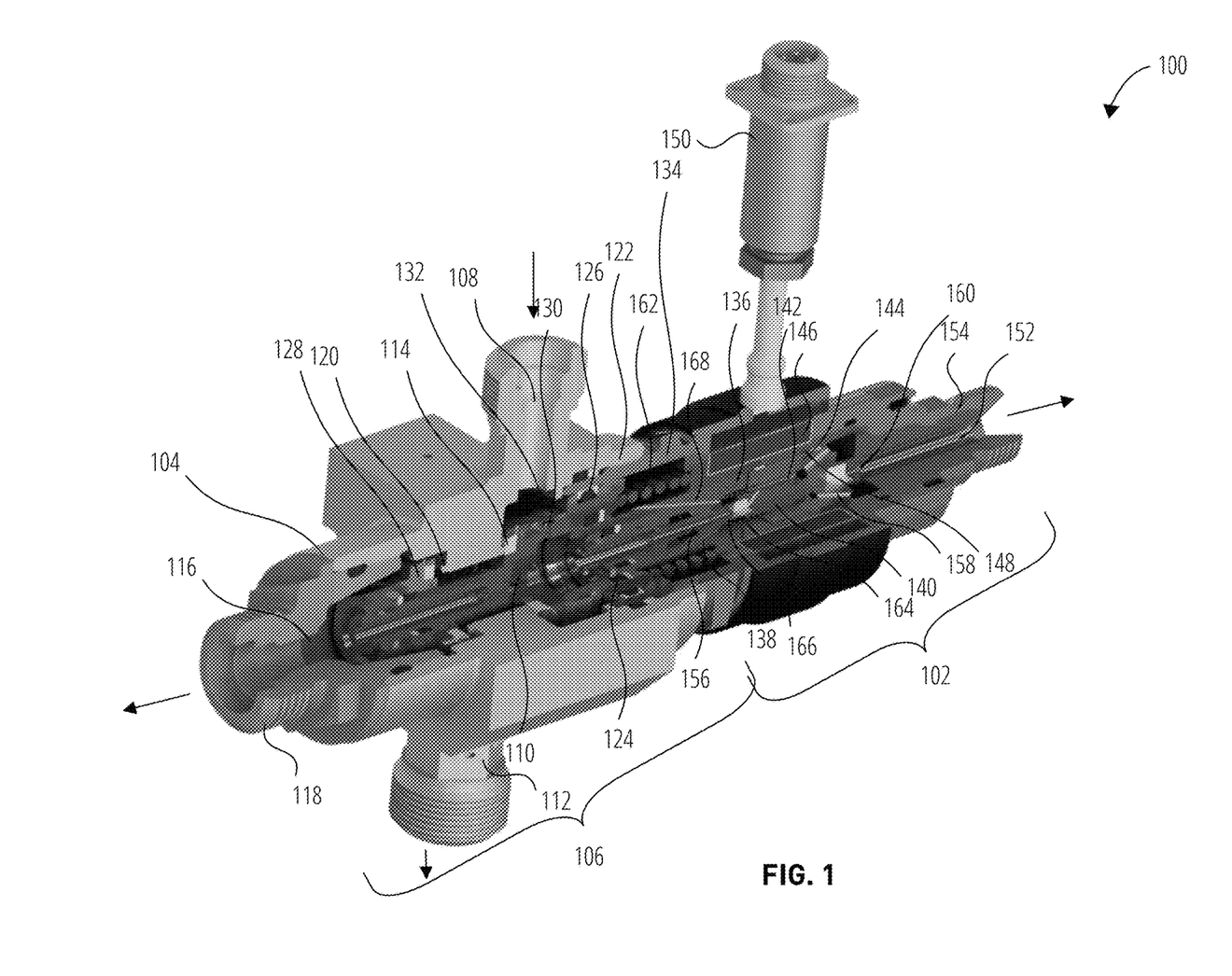
FIG. 1 is a front perspective part-sectional view of a solenoid valve assembly, in accordance with an example embodiment.

FIG. 1 is a front perspective part-sectional view of a solenoid valve assembly 100, in accordance with an example embodiment. The solenoid valve assembly 100 may include a pilot assembly 102, a body 104, and a main poppet valve assembly 106.

As shown in FIG. 1, the body 104 may include an inlet cavity 108, a channel 110, and an outlet cavity 112. The body 104 may further include a main poppet valve seat 114 disposed in the channel 110 between the inlet cavity 108 and the outlet cavity 112.

The body 104 may include a drain cavity 116 disposed coaxially with respect to the channel 110. The drain cavity 116 may have a drain port 118 to enable the substance flow to exit the solenoid valve assembly 100. The body 104 may include a drain poppet valve seat 120.

The main poppet valve assembly 106 may include a main poppet valve 122, a first movable sealing element 124, and a second movable sealing element 126. The main poppet valve 122 can be configured to shut the main poppet valve seat 114, thereby stopping the substance flow from the inlet cavity 108 to the outlet cavity 112. The main poppet valve assembly 106 may further include a drain poppet valve 128 attached to the main poppet valve 122 and configured to touch the drain poppet valve seat 120 and thereby close the drain cavity 116.

The main poppet valve 122 may include a channel 130 for passing the substance flow from the inlet cavity 108 to the pilot assembly 102. The solenoid valve assembly 100 may include a filter 132 disposed at the entrance of the channel 130.

The pilot assembly 102 may include a frame 134, a solenoid carcass 136, an annular cavity 138, a pilot poppet valve 140, poppet-armature 144, an intake seat 166, and a slot 142 located between the poppet-armature 144 and a pilot poppet valve 140. The pilot assembly 102 may include a solenoid 146 and a magnetic circuit 148. The poppet-armature 144 may be attached to the main poppet valve 122. The pilot assembly 102 may further include an electrical connector 150 connected to the solenoid 146 for supplying an electrical current to the solenoid 146.

The pilot assembly 102 may include a drain cavity 152 and a drain port 154. The pilot assembly 102 may include a channel 168, a channel 156, and a channel 158 for passing the substance flow from the inlet cavity 108 to the drain cavity 152. The pilot assembly 102 may further include a drain seat 160 disposed in the drain cavity 152.

The solenoid valve assembly 100 may further include a spring 162 and a spring 164. Further details of the solenoid valve assembly 100 are provided in FIG. 2.

Figure 2:
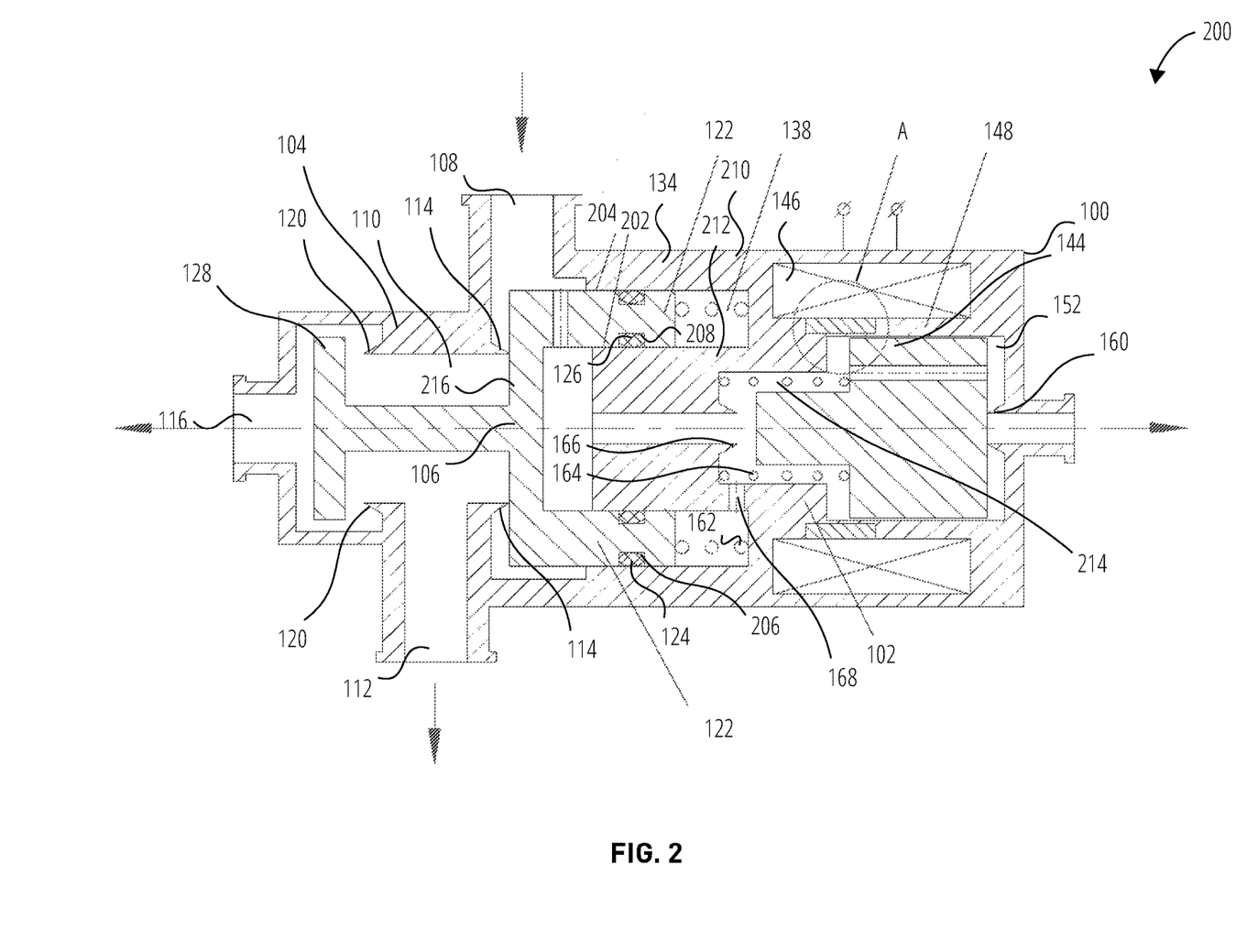
FIG. 2 is a schematic cross-sectional view of a solenoid valve assembly, in accordance with an example embodiment.

FIG. 2 is a schematic cross-sectional view 200 of a solenoid valve assembly, in accordance with an example embodiment. FIG. 2 depicts body 104, main poppet valve 122, and pilot assembly 102. The pilot assembly 102 incudes magnetic circuit 148. Details of the magnetic circuit 148 are provided in FIG. 3.

As shown in FIG. 2, the main poppet valve 122 may have a cylindrical shape having a continuous base 216, an internal diameter 202 and an external diameter 204. In some embodiments, a ratio of the external diameter 204 to the internal diameter 202 may be between 4 and 4.5. The main poppet valve 122 may include a first annular groove 206 on the external surface of the cylindrical shape and a second annular groove 208 on the internal surface of the cylindrical shape.

The frame 134 may include an external wall 210 and an internal wall 212. The external wall 210 and the internal wall 212 may form an annular cavity 138. The main poppet valve 122 may be at least partially disposed in the annular cavity 138 and configured to shut the main poppet valve seat 114 by the continuous base 216, thereby controlling a substance flow from the inlet cavity 108 via the channel 110 to the outlet cavity 112. The external diameter 204 is substantially constant along a longitudinal direction of the annular cavity 138.

The first movable sealing element 124 may be disposed in the first annular groove 206 to seal the main poppet valve 122 to the external wall 210 of the frame 134 of the pilot assembly 102. The second movable sealing element 126 may be disposed in the second annular groove 208 to seal the main poppet valve 122 to the internal wall 212 of the frame 134 of the pilot assembly 102. Thus, the first movable sealing element 124 and the second movable sealing element 126 forms a double movable seal.

The spring 162 can be disposed in the annular cavity 138 and configured to push the main poppet valve 122 toward the main poppet valve seat 114. Pushing of the main poppet valve 122 toward the main poppet valve seat 114 may move the drain poppet valve 128 outward of the drain poppet valve seat 120 to open the drain cavity 116.

The solenoid 146 and the magnetic circuit 148 may be configured to generate a magnetic flux to push the poppet-armature 144 (shown in FIG. 1), thereby causing the poppet-armature 144 to pull the main poppet valve 122 along a longitudinal direction of the annular cavity 138 and outward from the main poppet valve seat 114. The pilot assembly 102 may further include a spring 164 located in a cavity 214. When being pushed, the poppet-armature 144 may compress the spring 164 and close an intake seat 166. The cavity 214 and the annular cavity 138 may be connected by a channel 168.

Using the double movable seal (the first movable sealing element 124 and the second movable sealing element 126) in the main poppet valve assembly 106 and selecting the ratio of the external diameter 204 to the internal diameter 202 of the main poppet valve 122 to be between 4 and 4.5 may allow optimizing the weight and dimensional characteristics of the solenoid valve assembly 100, thereby reducing the actuation time of the solenoid valve assembly 100 and facilitating the manufacturability of the solenoid valve assembly 100.

Specifically, due to the use of the double movable seal, the solenoid valve assembly 100 may have a modular structure as shown in FIG. 1, namely, to include the pilot assembly 102 and the main poppet valve assembly 106, which, in turn, enables using the solenoid valve assembly 100 in two modifications. In particular, the first modification is with drainage in the pilot assembly 102 and the second modification is without drainage in the pilot assembly 102. Specifically, the solenoid valve assembly 100 may have optional drain cavity 116, drain poppet valve seat 120, and drain poppet valve 128. Both modifications have a control block represented by the main poppet valve assembly 106 and have the main spring (shown as a spring 162), while the pilot assembly 102 can be changed depending on the modification. Additional adjustment of the main poppet valve assembly 106 and the pilot assembly 102 is not required.

Moreover, using the double movable seal and the selected ratio of the external diameter 204 to the internal diameter 202 of the main poppet valve 122 enables simplifying the structure of the pilot assembly 102 both structurally and technologically. This results in reduction of weight and dimensional characteristics of the solenoid valve assembly 100 in 1.5 to 2 times in comparison with conventional solenoid valves with operating pressures of 120 to 240 kgf/cm² (kilogram-force per square centimeter) and diameters of pipelines at the inlet of 8 to 12 mm.

Furthermore, the structure of the solenoid valve assembly 100 enables increasing the performance of the solenoid valve assembly 100 at the time of closing up to 20 to 25% (by reducing the actuation time of the solenoid valve assembly 100) due to reduction of the volume of the annular cavity 138 (acting as a control cavity).

Figure 3:
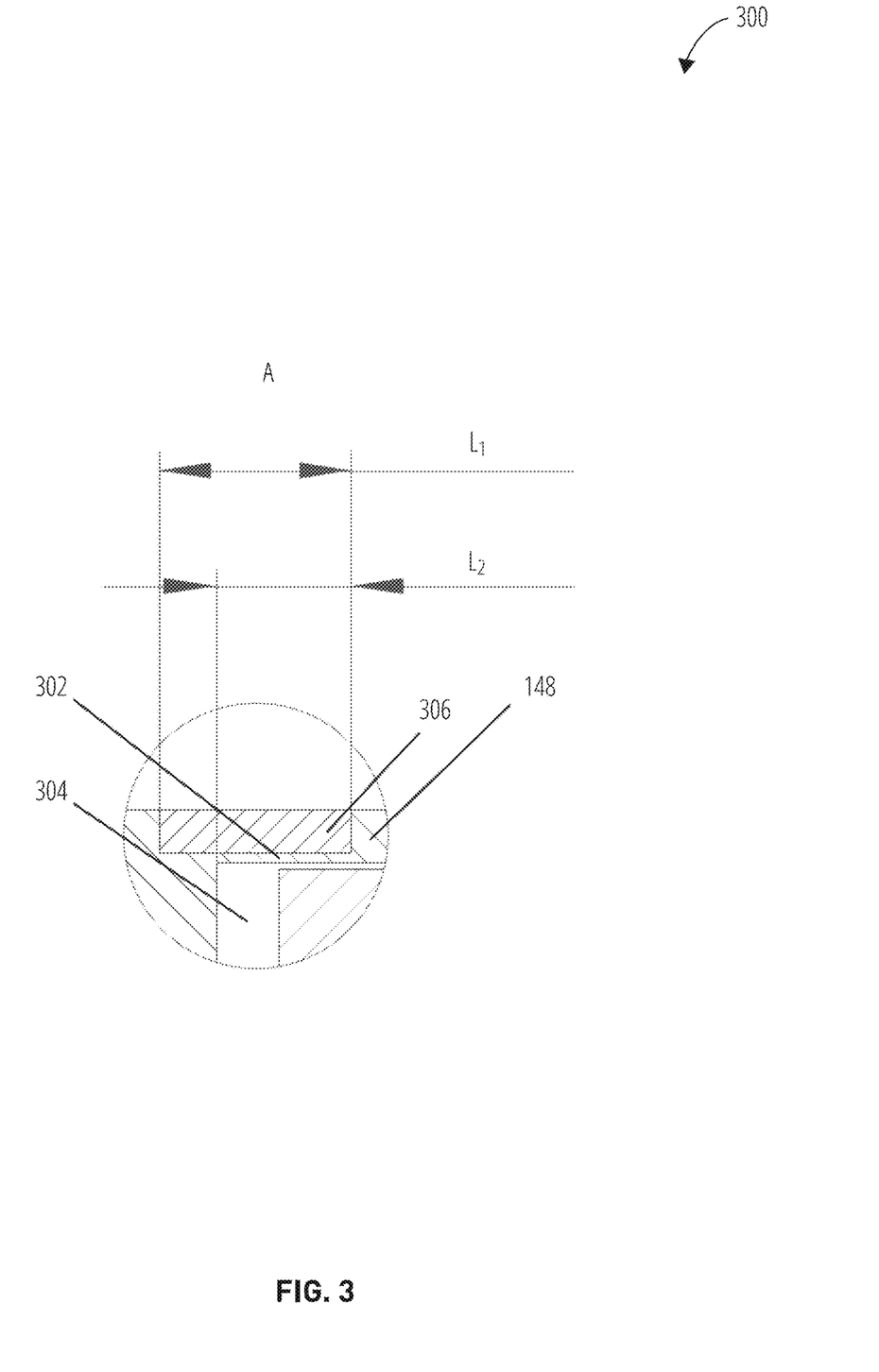
FIG. 3 is a partial detailed view of a portion of the cross-sectional view of FIG. 2, in accordance with an example embodiment.

FIG. 3 is a partial detailed view 300 of a portion A of the cross-sectional view 200 shown in FIG. 2, in accordance with an example embodiment. The partial detailed view 300 shows a magnetic circuit 148, according to an example embodiment. The magnetic circuit 148 may include a magnetic shunt 302 disposed in an area of a working magnetic gap 304 of the magnetic circuit 148.

The magnetic shunt 302 may have a thickness of less than a thickness of the rest of the magnetic circuit 148, i.e., less than a thickness of a remaining portion of the magnetic circuit 148. In view of differences in thicknesses, a working area of the magnetic shunt 302 may be from 10% to 15% of a working area of the magnetic circuit 148. Therefore, the solenoid valve assembly 100 may have a magnetic shunt 302 that has the form of a thin-walled region of the magnetic circuit 148 in the area of the working magnetic gap 304.

When the solenoid 146 is activated, the thin-walled region of the magnetic circuit 148 becomes saturated. In magnetic materials, saturation is the state reached when an increase in applied external magnetic field cannot increase the magnetization of the magnetic material further, so the total magnetic flux density levels off. The saturation of the magnetic circuit 148 creates resistance to the magnetic flux, thereby directing the magnetic flux through the working magnetic gap 304. Conventional solenoids of a similar type show the loss of more than 10% of the power characteristics of the solenoid 146. Moreover, the working area of the magnetic shunt in conventional solenoids is at least 20% of the working area of the magnetic circuit.

In some embodiments of the present disclosure, a ratio of a total length (shown as $L_1$) of the magnetic shunt 302 to an effective length (shown as $L_2$) of the magnetic shunt 302 may be between 1.2 and 1.5. The reduction of the working area of the magnetic shunt 302 up to 10 to 15% of the area of the magnetic circuit 148, as well selection of the ratio of the total length $L_1$ to the effective length $L_2$ of the magnetic shunt 302 to be between 1.2 and 1.5, enables limiting the loss of power characteristics of the solenoid 146 at the level of not more than 5%.

In some example embodiments, the pilot assembly 102 may include a structural support tube 306 configured to reinforce the magnetic shunt 302. Specifically, as the magnetic shunt 302 is the mechanically weakened region of the magnetic circuit 148, the magnetic shunt 302 is reinforced with the structural support tube 306 by using laser welding.

The structural support tube 306 ensures the operability of the solenoid valve assembly 100 at the operating pressure of up to 240 kgf/cm².

Figure 4:
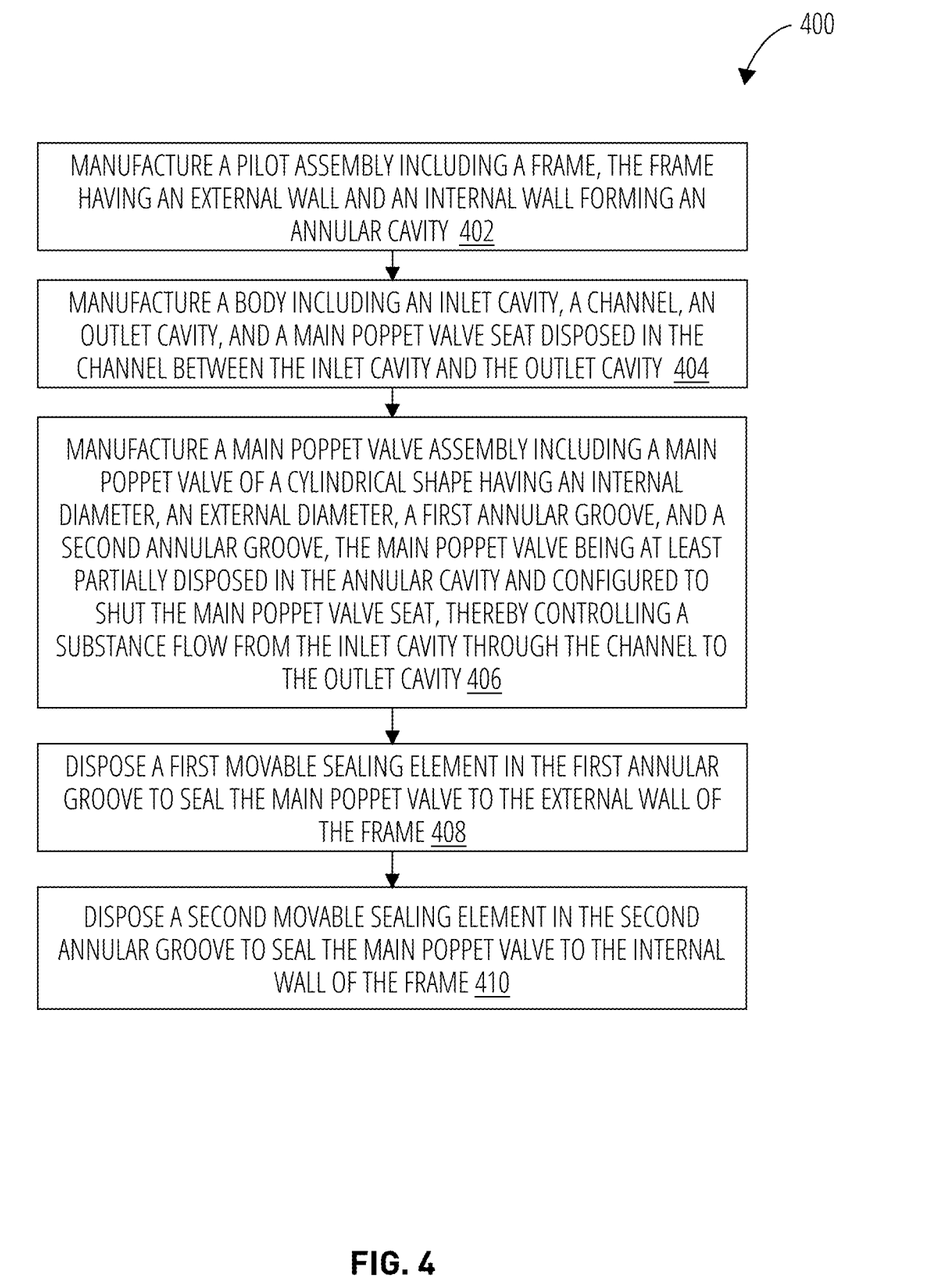
FIG. 4 is a flow chart of a method for manufacturing a solenoid valve assembly, in accordance with an example embodiment.

FIG. 4 is a flow chart of a method 400 for manufacturing a solenoid valve assembly, according to an example embodiment. In some embodiments, the operations may be combined, performed in parallel, or performed in a different order. The method 400 may also include additional or fewer operations than those illustrated.

The method 400 may commence in block 402 with manufacturing a pilot assembly. The pilot assembly may include a frame that may have an external wall and an internal wall forming an annular cavity.

In block 404, the method 400 may continue with manufacturing a body that may include an inlet cavity, a channel, an outlet cavity, and a main poppet valve seat disposed in the channel between the inlet cavity and the outlet cavity. The body may further include a drain cavity and a drain seat. The drain cavity may be disposed coaxially with respect to the channel. The drain seat may be disposed in the drain cavity.

In block 406, the method 400 may include manufacturing a main poppet valve assembly. The main poppet valve assembly may include a main poppet valve of a cylindrical shape having an internal diameter, an external diameter, a first annular groove, and a second annular groove. In an example embodiment, a ratio of the external diameter to the internal diameter may be between 4 and 4.5. The main poppet valve assembly may include a drain poppet valve attached to the main poppet valve and configured to shut the drain seat.

The main poppet valve may be at least partially disposed in the annular cavity and configured to shut the main poppet valve seat, thereby controlling a substance flow from the inlet cavity through the channel to the outlet cavity. The method 400 may further optionally include disposing a spring in the annular cavity. The spring may be configured to push the main poppet valve toward the main poppet valve seat.

In block 408, the method 400 may include disposing a first movable sealing element in the first annular groove to seal the main poppet valve to the external wall of the frame.

In block 410, the method 400 may include disposing a second movable sealing element in the second annular groove to seal the main poppet valve to the internal wall of the frame.

In an example embodiment, the pilot assembly may include a poppet-armature, a solenoid, and a magnetic circuit. The poppet-armature may be attached to the main poppet valve. The solenoid and the magnetic circuit may be configured to generate a magnetic flux to push the poppet-armature, thereby causing the poppet-armature to pull the main poppet valve along a longitudinal direction of the annular cavity and outward from the main poppet valve seat. The magnetic circuit may include a magnetic shunt disposed in an area of a working magnetic gap of the magnetic circuit. The magnetic shunt may have a thickness of less than a thickness of the rest of the magnetic circuit. In an example embodiment, a working area of the magnetic shunt may be from 10% to 15% of a working area of the magnetic circuit. A ratio of a total length of the magnetic shunt to an effective length of the magnetic shunt may be between 1.2 and 1.5. The pilot assembly may further include a bandage configured to reinforce the magnetic shunt.

Thus, a solenoid valve assembly and a method for manufacturing a solenoid valve assembly are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A solenoid valve assembly comprising:
   a pilot assembly including a frame, the frame having an external wall and an internal wall forming an annular cavity;
   a body including an inlet cavity, a channel, an outlet cavity, and a main poppet valve seat disposed in the channel between the inlet cavity and the outlet cavity; and
   a main poppet valve assembly including:
      a main poppet valve of a cylindrical shape having a continuous base, an internal diameter, an external diameter, a first annular groove, and a second annular groove, the main poppet valve being at least partially disposed in the annular cavity and configured to shut the main poppet valve seat by the continuous base and thereby control a substance flow from the inlet cavity via the channel to the outlet cavity, wherein the external diameter is substantially constant along a longitudinal direction of the annular cavity;
      a first movable sealing element disposed in the first annular groove to seal the main poppet valve to the external wall of the frame; and
      a second movable sealing element disposed in the second annular groove to seal the main poppet valve to the internal wall of the frame.

2. The solenoid valve assembly of claim 1, wherein a ratio of the external diameter to the internal diameter is between 4 and 4.5.

3. The solenoid valve assembly of claim 1, wherein the body includes a drain cavity disposed coaxially with respect to the channel.

4. The solenoid valve assembly of claim 3, wherein:
   the body includes a drain poppet valve seat disposed in the drain cavity; and
   the main poppet valve assembly includes a drain poppet valve attached to the main poppet valve and configured to shut the drain poppet valve seat.

5. The solenoid valve assembly of claim 1, further comprising a spring disposed in the annular cavity and configured to push the main poppet valve toward the main poppet valve seat.

6. The solenoid valve assembly of claim 1, wherein the pilot assembly includes:
   a poppet-armature attached to the main poppet valve; and
   a solenoid and a magnetic circuit configured to generate a magnetic flux to push the poppet-armature and thereby cause the poppet-armature to pull the main poppet valve along the longitudinal direction of the annular cavity and outward from the main poppet valve seat.

7. The solenoid valve assembly of claim 6, wherein the magnetic circuit includes a magnetic shunt disposed in an area of a working magnetic gap of the magnetic circuit, the magnetic shunt having a thickness of less than a thickness of the rest of the magnetic circuit.

8. The solenoid valve assembly of claim 7, wherein a working area of the magnetic shunt is from 10% to 15% of a working area of the magnetic circuit.

9. The solenoid valve assembly of claim 7, wherein a ratio of a total length of the magnetic shunt to an effective length of the magnetic shunt is between 1.2 and 1.5.

10. The solenoid valve assembly of claim 7, wherein the pilot assembly includes a structural support tube configured to reinforce the magnetic shunt.

11. A method for manufacturing a solenoid valve assembly, the method comprising:
    manufacturing a pilot assembly including a frame, the frame having an external wall and an internal wall forming an annular cavity;
    manufacturing a body including an inlet cavity, a channel, an outlet cavity, and a main poppet valve seat disposed in the channel between the inlet cavity and the outlet cavity;
    manufacturing a main poppet valve assembly including a main poppet valve of a cylindrical shape having a continuous base, an internal diameter, an external diameter, a first annular groove, and a second annular groove, the main poppet valve being at least partially disposed in the annular cavity and configured to shut the main poppet valve seat by the continuous base and thereby control a substance flow from the inlet cavity via the channel to the outlet cavity, wherein the external diameter is substantially constant along a longitudinal direction of the annular cavity;
    disposing a first movable sealing element in the first annular groove to seal the main poppet valve to the external wall of the frame; and
    disposing a second movable sealing element in the second annular groove to seal the main poppet valve to the internal wall of the frame.

12. The method of claim 11, wherein a ratio of the external diameter to the internal diameter is between 4 and 4.5.

13. The method of claim 11, wherein the body includes a drain cavity disposed coaxially with respect to the channel.

14. The method of claim 13, wherein:
    the body includes a drain poppet valve seat disposed in the drain cavity; and
    the main poppet valve assembly includes a drain poppet valve attached to the main poppet valve and configured to shut the poppet valve drain seat.

15. The method of claim 11, further comprising disposing a spring in the annular cavity, the spring being configured to push the main poppet valve toward the main poppet valve seat.

16. The method of claim 11, wherein the pilot assembly includes:
    a poppet-armature attached to the main poppet valve; and
    a solenoid and a magnetic circuit configured to generate a magnetic flux to push the poppet-armature and thereby cause the poppet-armature to pull the main poppet valve along the longitudinal direction of the annular cavity and outward from the main poppet valve seat.

17. The method of claim 16, wherein the magnetic circuit includes a magnetic shunt disposed in an area of a working magnetic gap of the magnetic circuit, the magnetic shunt having a thickness of less than a thickness of the rest of the magnetic circuit.

18. The method of claim 17, wherein a working area of the magnetic shunt is from 10% to 15% of a working area of the magnetic circuit.

19. The method of claim 17, wherein a ratio of a total length of the magnetic shunt to an effective length of the magnetic shunt is between 1.2 and 1.5.

20. The method of claim 17, wherein the pilot assembly includes a structural support tube configured to reinforce the magnetic shunt.

* * * * *